US008228196B1

(12) United States Patent
Thornton

(10) Patent No.: US 8,228,196 B1
(45) Date of Patent: Jul. 24, 2012

(54) DISPLAYING ADVERTISEMENTS BASED ON ELECTRONIC TAGS

(75) Inventor: Seth A. Thornton, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 869 days.

(21) Appl. No.: 12/180,335

(22) Filed: Jul. 25, 2008

(51) Int. Cl.
*G08B 13/14* (2006.01)
*H04Q 5/22* (2006.01)
*G05B 19/00* (2006.01)
*G06K 15/00* (2006.01)
*G06F 19/00* (2011.01)

(52) U.S. Cl. .............. 340/572.1; 340/10.6; 340/5.91; 340/5.92; 235/378; 235/385

(58) Field of Classification Search .............. 340/10.6, 340/572.1, 5.92, 5.91, 5.9; 709/224; 705/14, 705/15, 16; 235/375–385, 492
See application file for complete search history.

(56) References Cited

U.S. PATENT DOCUMENTS

| | | | |
|---|---|---|---|
| 6,439,349 B1 * | 8/2002 | Smith | 187/382 |
| 2002/0029186 A1 * | 3/2002 | Roth et al. | 705/37 |
| 2002/0170961 A1 * | 11/2002 | Dickson et al. | 235/383 |
| 2004/0103034 A1 * | 5/2004 | Reade et al. | 705/16 |
| 2004/0249930 A1 * | 12/2004 | Mousavi et al. | 709/224 |
| 2005/0064867 A1 * | 3/2005 | Nitta | 455/432.3 |
| 2005/0187819 A1 * | 8/2005 | Johnson | 705/14 |
| 2007/0007337 A1 * | 1/2007 | Clark et al. | 235/383 |
| 2008/0249842 A1 * | 10/2008 | Lee et al. | 705/10 |

* cited by examiner

*Primary Examiner* — Benjamin C Lee
*Assistant Examiner* — Omeed Alizada

(57) ABSTRACT

A system is provided for displaying advertisements based on electronic tags. The system includes a mobile device, a server, and a display. The mobile device reads information from a plurality of radio frequency identification tags associated with a plurality of items and transmits the information. The server receives the information, selects an advertisement based on the information, and transmits the selected advertisement. The display receives the selected advertisement and displays the selected advertisement.

18 Claims, 4 Drawing Sheets

DISPLAYING ADVERTISEMENTS BASED ON ELECTRONIC TAGS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic tags are becoming ubiquitous. Electronic tags include radio-frequency identification (RFID) tags, which are objects that can be applied to or incorporated into an item, animal, or person for the purpose of identification using radio waves. RFID tags typically contain two parts. The first part is an integrated circuit for storing and processing information, modulating and demodulating a radio frequency (RF) signal and perhaps other specialized functions. The second part is an antenna for receiving and transmitting the signal. Some RFID tags can be read from several meters away and beyond the line of sight of the reader. Electronic tags may also be based on near field communication (NFC), which is a short-range high frequency wireless communication technology which enables the exchange of data between devices over about a 10 centimeter (~4 inches) distance. Electronic tags also include security tags, which is a generic name for the anti-theft tags retailers put on garments and other items to prevent them from being shoplifted. There are different types of security tags, including hard plastic tags and alarm stickers that set off alarms at the entrance of a store. Security tags are used as part of an electronic article surveillance system. Electronic article surveillance (EAS) systems are composed of many elements including entrance and exit detection systems, alarm or security tags, tag removers, tag deactivators, and many peripherals.

SUMMARY

In some embodiments, a system is provided for displaying advertisements based on electronic tags. The system includes a mobile device, a server, and a display. The mobile device reads information from a plurality of radio frequency identification tags associated with a plurality of items and transmits the information. The server receives the information, selects an advertisement based on the information, and transmits the selected advertisement. The display receives the selected advertisement and displays the selected advertisement.

In other embodiments, information is read from a plurality of electronic tags associated with a plurality of items, and then transmitted. The information is received, an advertisement is selected based on the information, and the selected advertisement is transmitted. The selected advertisement is received and displayed on a display that is oriented for viewing by a plurality of individuals associated with the plurality of items.

In still other embodiments, a system is provided for displaying advertisements based on electronic tags. The system includes a reader, a server, and a display. The reader reads information from a plurality of electronic tags associated with a plurality of items and transmits the information. The server receives the information, selects an advertisement based on the information, and transmits the selected advertisement. The display receives the selected advertisement and displays the selected advertisement, wherein the display is oriented for viewing by a plurality of individuals associated with the plurality of items.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
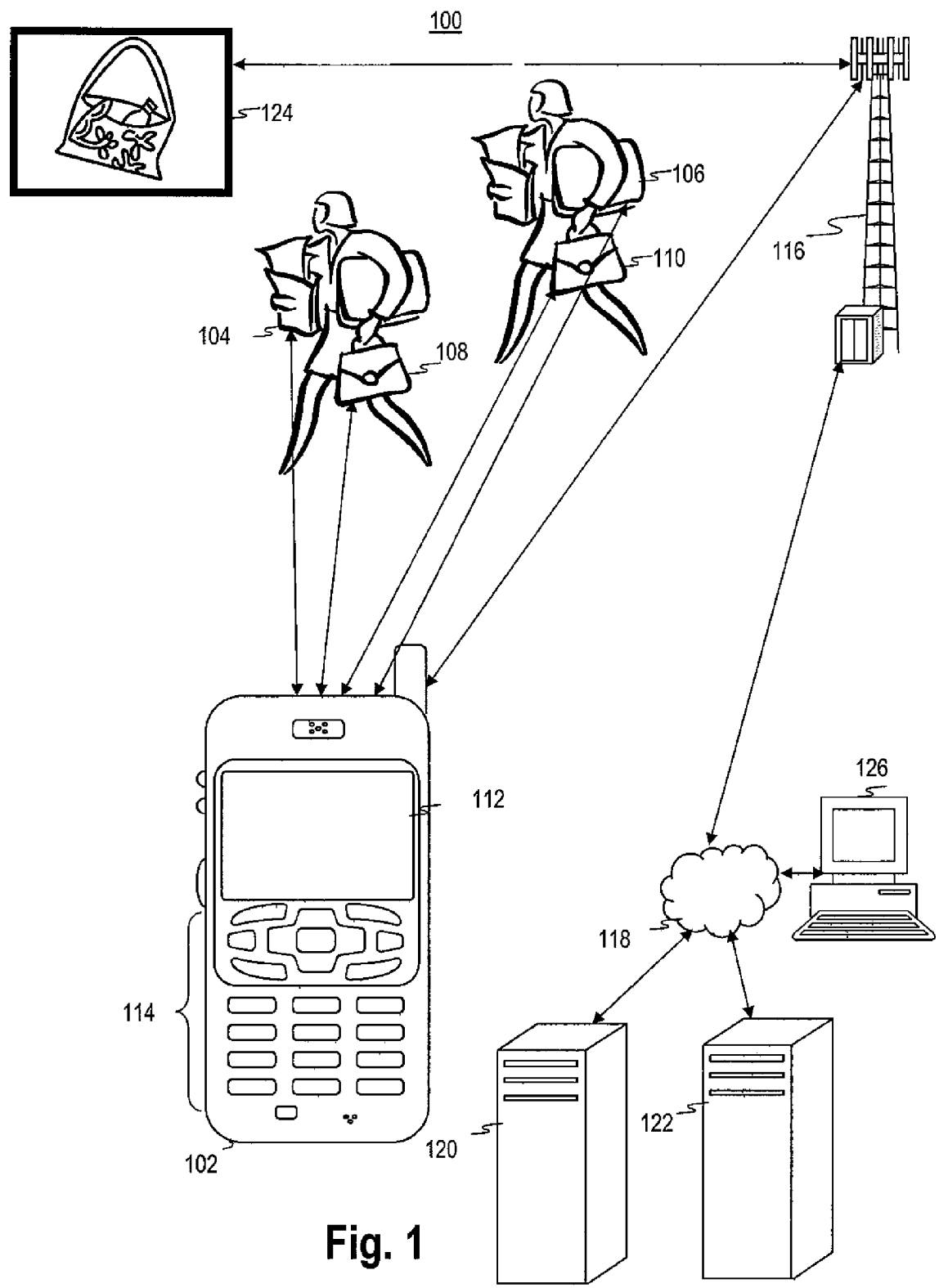
FIG. 1 illustrates a wireless communications system for displaying advertisements based on electronic tags.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, systems and methods are provided for displaying advertisements based on electronic tags. An RFID reader reads information from radio frequency identification tags associated with items in motion, such as consumer goods carried by potential customers, as opposed to stationary items that are offered for purchase. In some embodiments, instead of using fixed RFID readers, such as RFID readers that may be coupled to antennas that run along the floor of a shopping mall, RFID readers may be incorporated into mobile devices, such as mobile phones. The items in motion may be items that a potential customer is considering for purchase, or items purchased long ago from which owners have not removed the RFID tags. RFID tags may be small and embedded within fabrics or materials of products and be unnoticeable to the owner. The reader may transmit the information to a server, which may identify categories of items and specific items based on the information. For example, the server uses the information to identify the items as purses, and further identifies the items as a specific type of a designer purse and a specific type of an inexpensive purse. Advertisers may submit bids to the server for selecting their advertisements based on the combinations of items identified by the server. The server may select an advertisement, such as an advertisement for purchasing a new designer purse, based on the advertisers' bids and the information read from passing traffic in a store or along a walkway in a mall. The server may transmit the selected advertisement to a large display that is oriented for viewing by the owners of the identified items, such that the selected advertisement is displayed to the owners of the identified items. The selected advertisement is displayed to the owners of the identified items substantially in "real-time." For example, the purse advertisement is selected and displayed on the large display in the store or along the walkway in the mall before the owners of the identified purses have time to leave the location where the RFID tags associated with their purses were read and where the large display is also located. Displaying advertisements to potential customers that are related to items that are carried by the customers may reinforce brand loyalty or entice the customer to consider purchasing an alternative to the item they own or are considering for purchase. Any RFID tag may remain with its associated item throughout the time that the owner owns the item Instead of RFID tags, other types of electronic tags may be read. The selected advertisement may include an electronic coupon that the items' owners may download for purchasing an advertised item. The server can evaluate the effectiveness of the selected advertisement by determining whether the items in motion were subsequently detected at a location that sells the advertised item. For example, the large display displays the new designer purse advertisement in response to a reader reading two pairs of electronic tags that are each in motion. Soon thereafter, another reader located where the new designer purse is sold in the shopping mall reads one of the pairs of the electronic tags that was in motion earlier. The server infers that the owner of the pair of items associated with the pair of electronic tags was motivated by the new designer purse advertisement to visit the location in the shopping mall where the new designer purse is sold. The server may provide reports to advertisers that detail how often their advertisements were displayed, which combination of categories of items and specific items resulted in their advertisements being displayed, and which combination of categories of items and specific items resulted in their advertisements not being displayed. Advertisers may use such a report to revise their bid amounts and/or to specify different combinations of categories of items and items for displaying their advertisements.

FIG. 1 shows a wireless communications system 100 that illustrates the context for the present disclosure's systems and methods. The system includes a device 102 that can read information from electronic tags 104-110. Though illustrated as a mobile phone, the device 102 may take various forms including a personal digital assistant (PDA), a mobile computer, a digital camera, and a digital music player, each of which includes a reader. The device 102 may also take various forms of readers, including a reader associated with a floor antenna, a reader associated with a plurality of antennas, a reader associated with a shopping cart, and a reader associated with a shopping basket. Many suitable devices 102 combine some or all of these functions. If it is integrated into the device 102, the reader reads the information from the electronic tags 104-110, wherein the device 102 is in communication with the reader and reads information from the electronic tags 104-110 via the reader.

The electronic tags 104-110 may be radio frequency identification tags, near field communication devices, security tags, or other similar electronic tags. The electronic tags 104-110 are provided to items, such as watches, electronic devices, purses, shoes, clothing, and other consumer goods. The electronic tags 104-110 are typically only millimeters wide and long, and may be embedded in or attached to items such that the electronic tags 104-110 cannot be seen. The electronic tags 104-110 include information that can be used to uniquely identify the items with which the electronic tags 104-110 are associated. For example, the electronic tag 104 identifies its associated item as a pair of expensive designer shoes, the electronic tag 106 identifies its associated item as an expensive designer dress, the electronic tag 108 identifies its associated item as an inexpensive purse, and the electronic tag 110 identifies its associated item as an expensive designer purse.

The device 102 includes a display 112 and a touch-sensitive surface or keys 114 with which the user can interact. The device 102 may present options for the user to select, controls for the user to actuate, and/or cursors or other indicators for the user to direct. The device 102 may further accept data entry from the user, including numbers to dial or various parameter values for configuring the operation of the device 102. The device 102 may further execute one or more software or firmware applications in response to user commands. These applications may configure the device 102 to perform various customized functions in response to user interaction.

In the illustrative system 100, the device 102 communicates through a base transceiver station 116 and a wired or wireless network 118 to access information on various servers, such as a communication server 120 and a content server 122. While one base transceiver station 116 is shown in FIG. 1, other base transceiver stations 116 could be present. The device 102 may also communicate through a wireless access point or some other wireless communication access node. In an embodiment, the base transceiver station 116 may be a femtocell. A femtocell, also known as an access point base station, may be a small cellular base station. The content server 122 can include a database for information about items that are associated with electronic tags.

The system 100 also includes a display 124 that may be oriented for viewing by individuals associated with the items. The display 124 may be a stationary display or a projection on a surface. The display 124 may be located within a configurable proximity from the device 102 so that the individuals that have the items with the electronic tags 104-110 read by the device 102, for example individuals walking through a shopping mall, may view the selected advertisements based on the information from electronic tags 104-110. Additionally, the display 112 on the device 102 may display the selected advertisement based on the information read from the electronic tags 104-110. The system 100 may also include a user interface 126, which may be a personal computer, that may be used to access data stored on the communication server 120 or the content server 122, or reports provided by the communication server 120 of displayed advertisements.

FIG. 1 illustrates an example of two different individuals at a shopping mall. The first individual is carrying the pair of designer shoes associated with the electronic tag 104 and the inexpensive purse associated with the electronic tag 108, while the second individual is carrying the designer dress associated with the electronic tag 106 and the designer purse associated with the electronic tag 110. The two individuals may be friends shopping together or strangers who do not interact with each other. Even though the designer shoes associated with the electronic tag 104 and the designer dress associated with the electronic tag 106 may be recent purchases, and the electronic tags 108 and 110 may be associated with purses purchased several years earlier, the device 102 may read all of the electronic tags 104-110.

The device 102 communicates information read from the electronic tags 104-110 through the base transceiver station 116 and the wired or wireless network 118 to the communication server 120, which selects a new designer purse advertisement based on the information from electronic tags 104-110 and transmits the advertisement to the display 124. The display 124 may be located within a close proximity to the individuals who have the items with the electronic tags 104-110 and oriented for viewing by individuals associated with the items so that the individuals may view the new designer purse advertisement.

Another reader subsequently detects the electronic tags 106 and 110 associated with the designer dress and the designer purse at a location associated with purchasing the designer purse that is displayed in the designer purse advertisement. The communication server 120 may infer that reading the electronic tags 106 and 110 at the location associated with purchasing the designer purse indicates that viewing the designer purse advertisement motivated the individual associated with the designer dress and the designer purse to visit the location associated with purchasing the designer purse.

Figure 2:
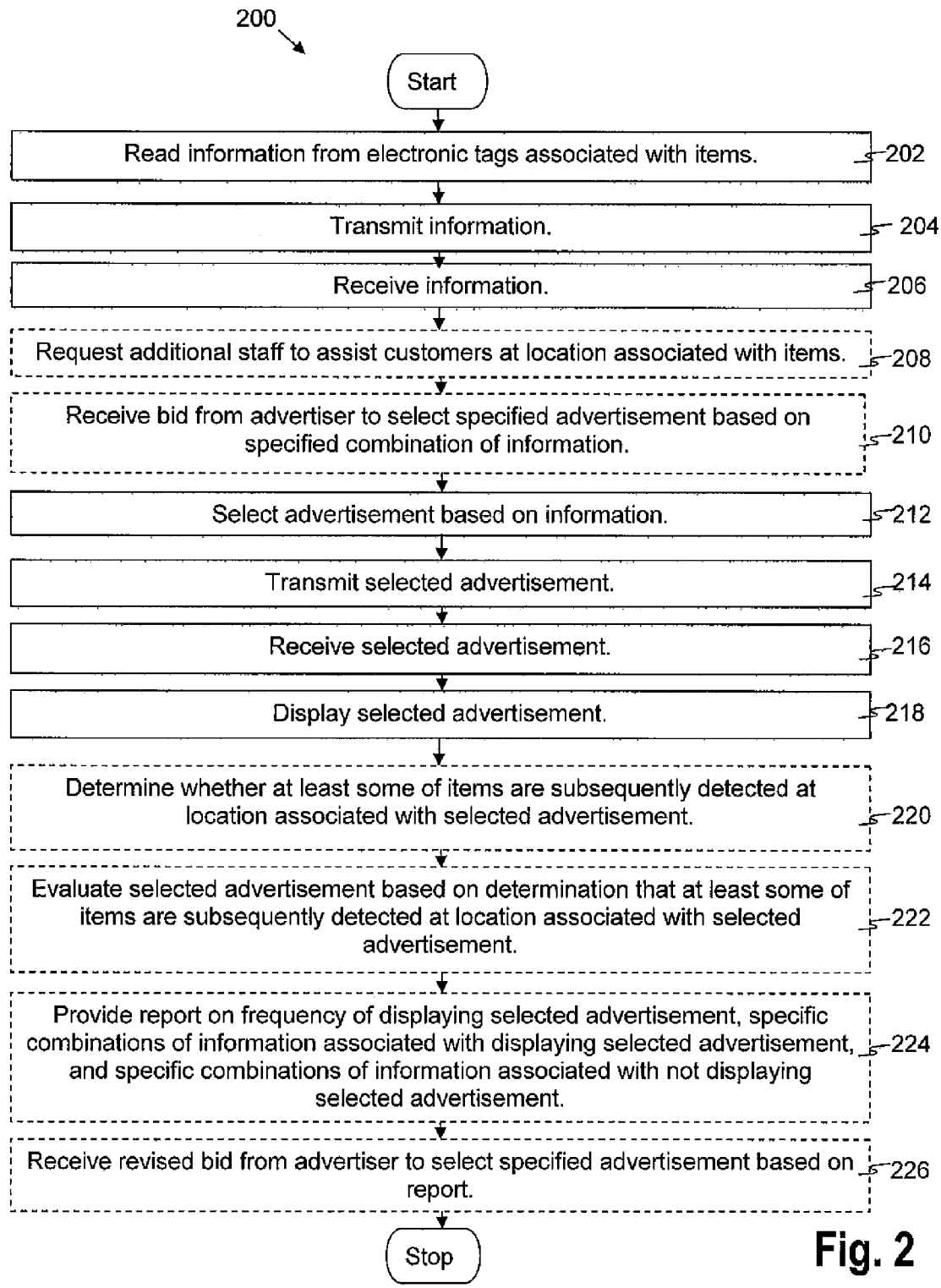
FIG. 2 is a flowchart of a method for displaying advertisements based on electronic tags according to some embodiments of the present disclosure.

FIG. 2 is a flowchart illustrating a method 200 for displaying advertisements based on electronic tags according to some embodiments of the present disclosure. The method can be executed to read information from the electronic tags 104-110 associated with items, to select an advertisement based on the information, and to display the advertisement.

In box 202, information is read from a plurality of electronic tags associated with a plurality of items. For example, the device 102 reads information from the RFID tags 104-110 associated with the shoes, dress, and purses. The reader may read information from the plurality of electronic tags that are detected within a configurable proximity to the reader. For example, the device 102 reads information from the RFID tags 104-110 that are detected within four meters of the device 102. The plurality of electronic tags that are detected within the specified proximity may be differentiated from a plurality of electronic tags within the specified proximity that are stationary. For example, the device 102 differentiates the RFID tags 104-110 from stationary RFID tags that are detected within four meters of the device 102, thereby enabling the device 102 to read information associated with items that potential customers are carrying through a department store and to disregard stationary items that are on retail display and available for purchase within the department store. The device 102 may read information from the RFID tags 104 and 108 associated with the items being carried by the owner of the device 102 and information from the RFID tags 106 and 110 associated with the items being carried by a second person. Furthermore, a second device 102 owned by the second person may also read the RFID tags 106 and 110 associated with the items being carried by the second person and read information from the RFID tags 104 and 108 associated with the items being carried by the owner of the first device 102. The system 100 processes the information to select an advertisement independent from which devices 102 read the information or how many devices 102 read the information.

In box 204, the information is transmitted. For example, the device 102 transmits the information read from the RFID tags 104-110 associated with the shoes, dress, and purses to the communication server 120. The device 102 may also determine a geographic location where the RFID tags 104-110 are read using at least one of a radio frequency identification technology, a global positioning system technology, a forward link triangulation technology, and a hybrid technology. The device 102 may supplement the information read from the RFID tags 104-110 with information based on the geographic location where the RFID tags 104-110 are read.

In box 206, the information is received. For example, the communication server 120 receives the information from the RFID tags 104-110 associated with the shoes, dress, and purses.

In box 208, additional staff is requested to assist customers at a location associated with the plurality of items. For example, the communication server 120 requests additional staff to assist a potential customer at the geographic location in the department store where the RFID tags 106 and 110 were read because the potential customer is carrying the designer dress and designer purse that are associated with the RFID tags 106 and 110, which indicates a propensity to purchase high margin items.

In box 210, a bid is received from an advertiser to select a specified advertisement based on a specified combination of information. The bids may be generated by an automated application, for example a bidding program or a bidding rules engine, operated by the advertiser. For example, the communication server 120 receives a bid from a designer purse advertiser to select a designer purse advertisement based on the information from the RFID tags 104-110. The designer purse advertiser may bid for the designer purse advertisement to be displayed when an RFID tag identifies the same purse in the proximity of the display 124 to reinforce brand loyalty for the purse's owner. The designer purse advertiser may bid for the designer purse advertisement to be displayed when an RFID tag identifies a competitor's designer purse in the proximity of the display 124 to entice the purse's owner to switch designer brands. The designer purse advertiser may bid for the designer purse advertisement to be displayed when an RFID tag identifies an inexpensive purse in the proximity of the display 124 to entice the purse's owner to upgrade to the designer purse. In contrast, an inexpensive purse advertiser may bid for an inexpensive purse advertisement that looks like a designer purse to be displayed when an RFID tag identifies the designer purse in the proximity of the display 124 to entice the purse's owner to consider saving money on her next purse purchase by purchasing the inexpensive look-alike instead. Although depicted in FIG. 2 as occurring after the server receives the information, bids may be received at any place in the method 200.

In box 212, an advertisement is selected based on the information. For example, the communication server 120 selects the designer purse advertisement based on the information from the RFID tags 104-110. Selecting the advertisement based on the information may include associating the information with at least one of specific items and specific item categories. For example, the communication server 120 associates the information from the RFID tags 104-110 with the categories of purses, dresses, and shoes, and also with the specific designer dress, specific designer shoes, specific designer purse, and specific inexpensive purse. Selecting the advertisement based on the information may include applying a set of rules to a plurality of bids associated with a plurality of specified advertisements and a plurality of specific combinations of information. For example, the communication server 120 applies a set of rules to the bid from the designer purse advertiser associated with the designer purse advertisement and the bid from inexpensive purse advertiser associated with the inexpensive purse advertisement. The designer purse advertiser may bid $5 for the designer purse advertisement to be selected when the purse category is detected and multiple designer items are detected. The inexpensive purse advertiser may bid $3 for the inexpensive purse advertisement to be selected when the categories of purses and shoes are detected and an inexpensive purse is detected. For this example, the communication server 120 selects the designer purse advertisement because the information from the RFID tags 104-110 matches both of these bids and the bid for the designer purse advertisement is higher. Each advertiser may bid different amounts for each of many different combinations of detected categories and items.

In some embodiments, selection may be based on a summary and/or digest of information about a plurality of RFID tags that have been read by the device 102. In other embodiments, however, selection may be based on an individual attribute associated with one RFID tag or based on a specific combination of attributes associated with a specific sub-set of the RFID tags read by the device 102.

In box 214, the selected advertisement is transmitted. For example, the communication server 120 transmits the designer purse advertisement to the display 124. In box 216, the selected advertisement is received. For example, the display 124 receives the designer purse advertisement from the communication server 120.

In box 218, the selected advertisement is displayed. For example, the display 124 displays the designer purse advertisement, where the display 124 is oriented for viewing by individuals associated with the designer shoes, the designer dress, the inexpensive purse, and the designer purse. The selected advertisement may include an electronic coupon, and the device 102 may select to receive the electronic coupon. For example, the designer purse advertisement displays an electronic coupon for purchasing the designer purse at a discount. In this example, the device 102 is a mobile phone carried by the customer who is carrying the designer shoes and the inexpensive purse. Upon viewing the designer purse advertisement, this customer may use her device 102 to select to receive the electronic coupon for purchasing the designer purse at a discount.

In box 220, whether at least some of the plurality of items is subsequently detected at a location associated with the selected advertisement is determined. For example, the communication server 120 determines whether another reader detects the RFID tags 106 and 110 associated with the designer dress and the designer purse at a location associated with purchasing the designer purse that is displayed in the designer purse advertisement. The other reader may not be able to uniquely identify the specific designer dress and the specific designer purse for which the display 124 displayed the designer purse advertisement. However, the communication server 120 may infer that the combination of the RFID tags 106 and 110 read at the location associated with purchasing the designer purse indicates that viewing the designer purse advertisement motivated the owner of the designer dress and the designer purse to visit the location associated with purchasing the designer purse.

In box 222, the selected advertisement is evaluated based on a determination that at least some of the plurality of items are subsequently detected at the location associated with the selected advertisement. For example, the communication server 120 evaluates the designer purse advertisement based on the frequency that some of the items in proximity of the display 124 when the designer purse advertisement is displayed are subsequently detected at the location associated with purchasing the designer purse that is displayed in the designer purse advertisement.

In box 224, a report is provided on a frequency of displaying the selected advertisement, specific combinations of information associated with displaying the selected advertisement, and specific combinations of information associated with not displaying the selected advertisement. For example, the communication server 120 provides a report for the designer purse advertiser to the user interface 126, where the report includes a reference to displaying the designer purse advertisement when the designer shoes, the designer dress, the inexpensive purse, and the designer purse were detected in proximity of the display 124. The report may also indicate that the designer shoes and the inexpensive purse were subsequently detected at the location associated with purchasing the designer purse that is displayed in the designer purse advertisement. In another example, the communication server 120 provides a report for the inexpensive purse advertiser to the user interface 126, where the report includes a reference to not displaying the inexpensive purse advertisement when the designer shoes, the designer dress, the inexpensive purse, and the designer purse were detected in proximity of the display 124.

In box 226, a revised bid is received from an advertiser to select a specified advertisement based on the report. For example, the communication server 120 receives a revised bid from the inexpensive purse advertiser to select the inexpensive purse advertisement based on a new bid price and a new combination of categories and items.

Figure 3:
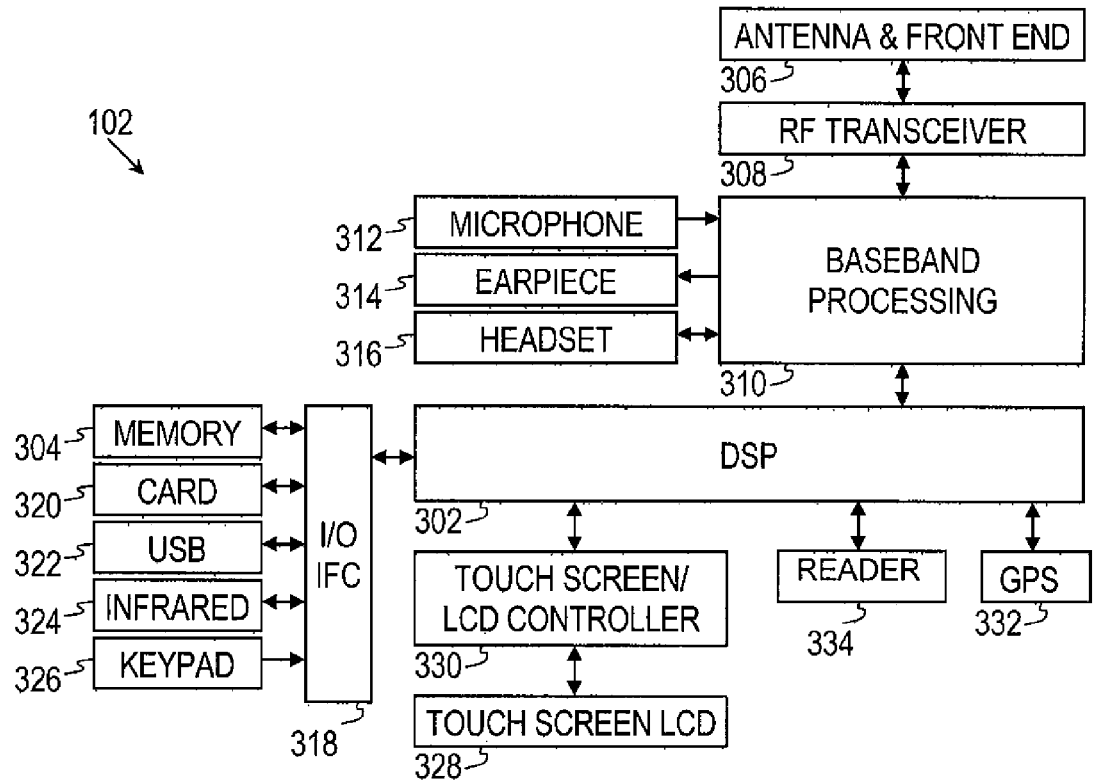
FIG. 3 is a block diagram of an illustrative mobile device.

FIG. 3 shows a block diagram of the device 102. While a variety of known components of a typical embodiment of the device 102 are depicted in FIG. 3, in some embodiments of the device 102 a subset of the listed components and/or additional components not listed may be included in the device 102. The device 102 includes a digital signal processor (DSP) 302 and a memory 304. As shown, the device 102 may further include an antenna and front end unit 306, a radio frequency (RF) transceiver 308, a baseband processing unit 310, a microphone 312, an earpiece speaker 314, a headset port 316, an input/output interface 318, a memory card 320, a universal serial bus (USB) port 322, an infrared port 324, a keypad 326, a liquid crystal display (LCD) with a touch sensitive surface 328, a touch screen/LCD controller 330, a global positioning system (GPS) sensor 332, and a reader 334. Some other type of display may be substituted for the LCD with the touch sensitive surface 328.

The DSP 302 or some other form of controller or central processing unit operates to control the various components of the device 102 in accordance with embedded software or firmware stored in the memory 304. In addition to the embedded software or firmware, the DSP 302 may execute other applications stored in the memory 304 or made available via information carrier media such as portable data storage media like the memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302 to execute some of the methods for displaying advertisements based on electronic tags.

The antenna and front end unit 306 converts between wireless signals and electrical signals, enabling the device 102 to send and receive information from a cellular network or some other available wireless communications network or from a peer handset 102. In an embodiment, the antenna and front end unit 306 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 306 may include antenna tuning and/or impedance matching components, RF power amplifiers, and/or low noise amplifiers.

The RF transceiver 308 may provide frequency shifting, e.g., converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the baseband processing unit 310 and/or the DSP 302 or other central processing unit. In some embodiments, the RF transceiver 308, portions of the antenna and front end 306, and the analog baseband processing unit 310 may be combined in one or more processing units and/or application specific integrated circuits (ASICs).

The baseband processing unit 310 may provide channel equalization, decoding, and signal demodulation to extract information from received signals, and may code and modulate information to create transmit signals, and may provide filtering for signals. To that end, the baseband processing unit 310 includes ports for connecting to the built-in microphone 312 and the earpiece speaker 314 that enable the device 102 to be used as a cell phone. The DSP 302 can also execute the baseband processing.

The DSP 302 can send and receive digital communications with a wireless network via the baseband processing unit 310. The DSP 302 may perform modulation and demodulation, coding and decoding, interleaving and deinterleaving, spreading and despreading, inverse fast Fourier transforming (IFFT) and fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The input/output interface 318 interconnects the DSP 302 and various memories and interfaces. The memory 304 and the removable memory card 320 may provide software and data to configure the operation of the DSP 302. The infrared port 324 and other optional ports such as a Bluetooth interface or an IEEE 802.11 compliant wireless interface enable the device 102 to communicate wirelessly with other nearby devices 102 and/or wireless base stations. In some contemplated systems, the device 102 is able to wirelessly exchange information at a point-of-sale when placed near a suitable transceiver.

The keypad 326 couples to the DSP 302 via the I/O interface 318 to provide one mechanism for the user to make selections, enter information, and otherwise provide input to the device 102. Another input mechanism may be the touch screen display 328, which may also display text and/or graphics to the user. The display controller 330 couples the DSP 302 to the touch screen display 328.

The GPS sensor 332 is coupled to the DSP 302 to decode global positioning system signals, thereby providing at least one technology for the device 102 to determine its location. Alternatively, GPS processing may be provided by a dedicated GPS chip or processor. The reader 334 is an electronic tag reader that can detect RFID signals and/or other types of signals from the electronic tags 104-110 and read information about items associated with the electronic tags 104-110 based on the signals. Various other peripherals may also be included to provide additional functions, e.g., radio and television reception.

Figure 4:
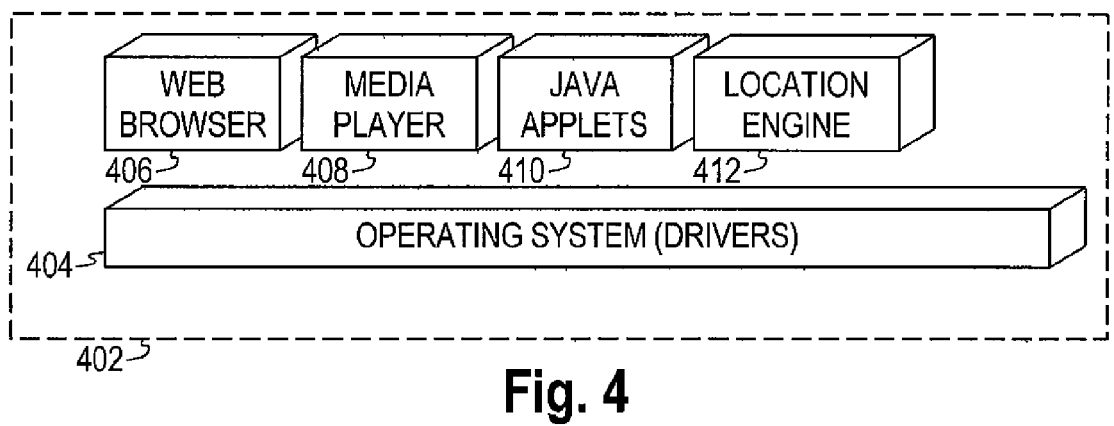
FIG. 4 is a block diagram of an illustrative software configuration for a mobile device.

FIG. 4 illustrates a software environment 402 that may be implemented by the DSP 302. The DSP 302 executes operating system software 404 that provides a platform from which the rest of the software operates. The operating system generally provides processing resource management support. The operating system software 404 provides drivers for the device hardware to make standardized interfaces available to application software. The operating system software 404 may transfer control between applications running on the device 102. Also shown in FIG. 4 are a web browser 406 application, a media player 408 application, JAVA applets 410, and a location engine 412 application. The web browser 406 application configures the device 102 to operate as a web browser, allowing the user to enter information into forms and select links to retrieve and view web pages. The media player 408 application configures the device 102 to retrieve and play audio or audiovisual media on its own output components. The JAVA applets 410 may configure the device 102 to provide games, utilities, and other functionality on the device 102. The location engine 412 application can execute a location fix technology for the device 102. The location engine 412 can also store and/or transmit item location information.

Figure 5:
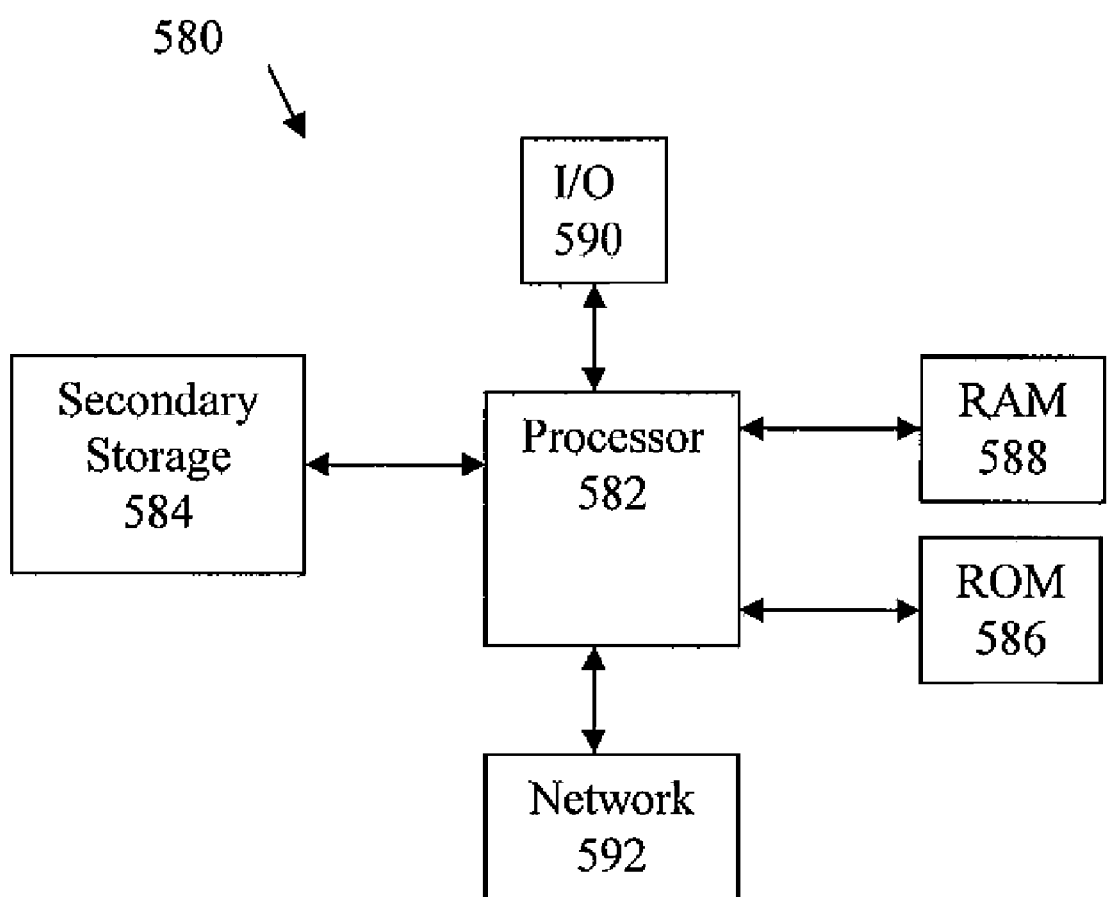
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein, such as the communication server 120. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for displaying advertisements based on electronic tags, comprising:

a mobile device configured to read information from a first radio frequency identification tag associated with a first previously purchased item and a first individual and a second radio frequency identification tag associated with a second previously purchased item and a second individual and to transmit the information, wherein the first previously purchased item is carried or worn by the first individual;

a server configured to receive the information, select an advertisement of a common category of items between the first and second individuals based on the information by associating the information with categories of the previously purchased items, and transmit the selected advertisement; and a display configured to receive the selected advertisement and display the selected advertisement, wherein the server is further configured to evaluate the effectiveness of the selected advertisement by determining whether at least one of the first previously purchased item and the second previously purchased item is subsequently detected at a location associated with an item of the selected advertisement.

2. The system of claim 1, wherein the mobile device is one of a mobile phone, a personal digital assistant, a mobile computer, a digital camera, and a digital music player.

3. The system of claim 1, further comprising a reader configured to read the information from the first radio frequency identification tag and the second radio frequency identification tag, wherein the mobile device is configured to be in communication with the reader and configured to read information from the first radio frequency identification tag and the second radio frequency identification tag via the reader.

4. The system of claim 1, wherein the mobile device comprises the display.

5. The system of claim 1, wherein the display is one of a stationary display and a projection on a surface.

6. The system of claim 5, wherein the display is located within a configurable proximity from the mobile device.

7. The system of claim 1, wherein the selected advertisement comprises an electronic coupon, and wherein the mobile device is further configured to select to receive the electronic coupon.

8. A method for displaying advertisements based on electronic tags, comprising:

reading information from a first electronic tag associated with a first previously purchased item and a first individual and a second electronic tag associated with a second previously purchased item and a second individual, wherein the first previously purchased item is carried or worn by the first individual;

transmitting the information;

receiving the information;

selecting an advertisement of a common category of items between the first and second individuals based on the information by associating the information with categories of the previously purchased items;

transmitting the selected advertisement;

receiving the selected advertisement;

displaying the selected advertisement on a display that is oriented for viewing by the first and second individuals; and evaluating the effectiveness of the selected advertisement by determining whether at least one of the first previously purchased item and the second previously purchased item is subsequently detected at a location associated with an item of the selected advertisement.

9. The method of claim 8, further comprising requesting additional staff to assist customers at a location associated with one of a plurality of items associated with the first individual.

10. The method of claim 8, further comprising receiving a bid from an advertiser to select a specified advertisement based on a specified combination of information.

11. The method of claim 10, wherein selecting the advertisement based on the information comprises applying a set of rules to a plurality of bids associated with a plurality of specified advertisements and a plurality of specific combinations of information.

12. The method of claim 8, wherein selecting the advertisement based on the information comprises associating the information with at least one of specific items and specific item categories.

13. The method of claim 8, further comprising providing a report on a frequency of displaying the selected advertisement, specific combinations of information associated with displaying the selected advertisement, and specific combinations of information associated with not displaying the selected advertisement.

14. The method of claim 13, further comprising receiving a revised bid from an advertiser to select a specified advertisement based on the report.

15. A system for displaying advertisements based on electronic tags, comprising:
   a reader configured to read information from a first electronic tag associated with a first previously purchased item and a first individual and a second electronic tag associated with a second previously purchased item and a second individual and to transmit the information, wherein the first previously purchased item is carried or worn by the first individual;
   a server configured to receive the information, select an advertisement of a common category of items between the first and second individuals based on the information by associating the information with categories of the previously purchased items, and transmit the selected advertisement; and
   a display configured to receive the selected advertisement and display the selected advertisement, wherein the display is oriented for viewing by the first and second individuals, and wherein the server is further configured to evaluate the effectiveness of the selected advertisement by determining whether at least one of the first previously purchased item and the second previously purchased item is subsequently detected at a location associated with an item of the selected advertisement.

16. The system of claim 15, wherein the reader is associated with one of a mobile device, a shopping cart, a shopping basket, a floor antenna, and a plurality of antennas.

17. The system of claim 15, wherein the reader reads information from the first electronic tag and the second electronic tag that are detected within a configurable proximity to the reader.

18. The system of claim 15, wherein the first electronic tag and the second electronic tag that are detected within the specified proximity are differentiated from a plurality of electronic tags within the specified proximity that are stationary.

* * * * *